US012248657B2

(12) United States Patent
Ray et al.

(10) Patent No.: US 12,248,657 B2
(45) Date of Patent: Mar. 11, 2025

(54) EXPANDED PREVIEW MODE FOR FOLDERS

(71) Applicant: MICROSOFT TECHNOLOGY LICENSING, LLC, Redmond, WA (US)

(72) Inventors: Suvojyoti Ray, Bengaluru (IN); Gulmohar Khan, Bengaluru (IN); Colin Day, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 46 days.

(21) Appl. No.: 18/076,294

(22) Filed: Dec. 6, 2022

(65) Prior Publication Data
US 2024/0184420 A1 Jun. 6, 2024

(51) Int. Cl.
G06F 3/048 (2013.01)
G06F 3/0482 (2013.01)
G06F 16/13 (2019.01)

(52) U.S. Cl.
CPC ............ G06F 3/0482 (2013.01); G06F 16/13 (2019.01); *G06F 2203/04803* (2013.01)

(58) Field of Classification Search
CPC .................................................... G06F 3/0482
See application file for complete search history.

(56) References Cited

U.S. PATENT DOCUMENTS

| | | | |
|---|---|---|---|
| 6,380,957 B1* | 4/2002 | Banning | G06F 3/0482 715/825 |
| 10,228,850 B2 | 3/2019 | Sharma et al. | |
| 10,318,034 B1* | 6/2019 | Hauenstein | G06F 3/0486 |
| 2004/0070608 A1* | 4/2004 | Saka | H04L 67/06 715/748 |
| 2011/0252374 A1* | 10/2011 | Chaudhri | H04M 1/72469 715/835 |
| 2014/0380232 A1 | 12/2014 | Campodonico et al. | |
| 2019/0129582 A1* | 5/2019 | Uchiumi | G06F 16/168 |
| 2019/0258363 A1* | 8/2019 | Parmar | G06F 3/0482 |

FOREIGN PATENT DOCUMENTS

| | | |
|---|---|---|
| WO | 2008153646 A1 | 12/2008 |
| WO | 2016023208 A1 | 2/2016 |

* cited by examiner

*Primary Examiner* — Claudia Dragoescu

(74) *Attorney, Agent, or Firm* — Newport IP, LLC; Jacob P. Rohwer

(57) ABSTRACT

The techniques disclosed herein enable systems to provide a streamlined user experience in file manager applications across diverse file contexts (e.g., local, cloud). This is accomplished by utilizing expanded folder previews that enable a user to view and interact with the contents of a folder without navigating into the folder itself. In various examples, an expanded folder preview is triggered by a user input within a user interface selecting a folder such as a hover gesture. Accordingly, the expanded folder preview displays some or all of the files and/or subfolders within the folder to enable contextual actions such as file uploads and transfers. In addition, the expanded folder preview can be customized based on the file context of the associated folder. For instance, a local folder preview can provide preview renderings of file content. In another example, a collaborative folder preview can identify other users with access to the file.

20 Claims, 8 Drawing Sheets

```
┌─────────────────────────────────────────┐
│  DISPLAY USER INTERFACE ELEMENTS REPRESENTING A  │
│  PLURALITY OF FOLDERS DISTRIBUTED ACROSS DIFFERENT FILE │
│    CONTEXTS IN A FILE MANAGER USER INTERFACE    │
│                   502                   │
└─────────────────────────────────────────┘
                    │
                    ▼
┌─────────────────────────────────────────┐
│  RECEIVE USER INPUT SELECTING A FOLDER WHERE THE USER │
│     INPUT DOES NOT NAVIGATE INTO THE FOLDER     │
│                   504                   │
└─────────────────────────────────────────┘
                    │
                    ▼
┌─────────────────────────────────────────┐
│   IN RESPONSE TO THE USER INPUT, DISPLAY A VISUAL    │
│  EXPANSION OF THE FOLDER COMPRISING A USER INTERFACE │
│  ELEMENT REPRESENTING A CONTENT ITEM WITHIN THE FOLDER│
│                   506                   │
└─────────────────────────────────────────┘
                    │
                    ▼
┌─────────────────────────────────────────┐
│  DETERMINE A FILE CONTEXT OF THE FOLDER SELECTED BY THE │
│                USER INPUT               │
│                   508                   │
└─────────────────────────────────────────┘
                    │
                    ▼
┌─────────────────────────────────────────┐
│   GENERATE A SUPPLEMENTARY USER INTERFACE ELEMENT    │
│    BASED ON THE FILE CONTEXT THAT IS DISPLAYED      │
│   CONCURRENTLY WITH THE USER INTERFACE ELEMENT      │
│   REPRESENTING A CONTENT WITHIN THE FOLDER          │
│                   510                   │
└─────────────────────────────────────────┘
```

EXPANDED PREVIEW MODE FOR FOLDERS

BACKGROUND

As individuals and organizations alike center an increasing amount of daily activity around personal and shared computing through remote work, media consumption, and the like, the quality of the user experience accordingly takes on increased importance. One central component of this user experience is a file manager which enables a user to interact with files such as text, images, and audio through a graphical user interface (GUI) at a computing device such as personal computer. Interacting with files includes creating, opening, moving, and searching for files as well as modifying file attributes, properties, and permissions defined by file metadata. Moreover, individual files can be grouped into folders which aid in organizing files.

In addition, modern file manager applications enable a user to access files across various different contexts. For example, the user may have personal files stored locally on the computing device while simultaneously having other personal files stored in a cloud-based storage service. Furthermore, the user, along with their coworkers, may also have access to work files which are stored in a different cloud-based storage service to enable remote collaboration. Each of these represents a different respective context (e.g., a local context, a personal cloud context, a collaborative context).

Unfortunately, while a user can conveniently access individual contexts from the file manager, the experience of managing multiple files and/or folders between these contexts often remains disjointed and consequently cumbersome. For example, if a user wishes to move a file from a local folder to a collaborative folder, the user must first navigate into the local folder, resulting in a different user interface. The user must then select the file, exit the local folder to return to the previous user interface, navigate into the collaborative folder, and place the file. As such, what should have been a simple operation requires several separate user inputs and different user interfaces resulting in reduced efficiency and a potentially frustrating user experience.

It is with respect to these and other considerations that the disclosure made herein is presented.

SUMMARY

The techniques disclosed herein enhance the efficiency and functionality of file manager applications. This is accomplished by introducing an expanded folder preview also known as a library view for viewing and accessing content within a folder and/or context without navigating into the folder and/or context. As mentioned above, typical file management solutions require a user to separately navigate into different folders and/or contexts through several user inputs and different user interfaces. Stated another way, a user is restricted within a user interface to a single folder with no functionality for simultaneously interacting with multiple folders without generating another separate user interface.

When considering various features of the present disclosure, the analogy of a bookshelf and a filing cabinet is useful. A conventional file management application functions much like a physical filing cabinet. To move a file from a source folder to a destination folder, a user must open one of the drawers, find the source folder containing the file, remove the file from the source folder, open another drawer, find the destination folder, and place file in the destination folder. Such an order of operations translates to an unnecessarily cumbersome user experience in file management applications. Conversely, the folder preview discussed herein is functions much like a bookshelf. In contrast to the filing cabinet, one can approach a bookshelf and immediately see the contents of the bookshelf (i.e., individual books), remove a book from the shelf, and move the book to another shelf.

In terms of a file management application, a context (e.g., local context, cloud context, collaborative context) is analogous a bookshelf, while individual folders contexts are analogous to individual shelves, and a book is analogous to a file. To trigger folder previews, the disclosed system can receive a user input within a file manager user interface (UI) at one or more user interface elements that represent associated folders. For example, the user input can be a click input on an input device such as a mouse or a touchscreen. Alternatively, the user input can be a hover gesture in which a which satisfies a threshold hover time.

In response to the user input, the file manager user interface can generate a folder preview that includes a visual expansion of the folder to display the content of the folder. In various examples, the user input causes the visual expansion of the folder and does not navigate into the folder. That is, the visual expansion enables access to files contained by the folder within the same file manager user interface and does not transition to a different user interface. In this way, the user experience is streamlined thereby improving efficiency and minimizing inadvertent or extraneous inputs.

In addition, to enhance and differentiate the user experience within different contexts, supplementary user interface elements can be displayed in association with individual files based on the context of the file. For example, files stored in a local context can include a supplementary user interface element presenting a preview of the file data (e.g., image, text). In another example, a file stored in a collaborative context can displayed with a supplementary user interface element showing other users who have access to the file and/or a timestamp showing the most recent changes to the file.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 5 is a flow diagram showing aspects of a routine for enabling a streamlined file manager user interface with customized contextual actions.

DETAILED DESCRIPTION

The techniques enhance file management applications by introducing expanded folder previews and supplementary user interface elements to streamline the user experience. In the context of the present disclosure, a file is any computing resource for recording digital data such as text, images, video, program code, and so forth. Accordingly, one or several files can be organized into a folder. Furthermore, a folder can itself contain other folders which can in turn contain individual files. Conversely, a folder can also be left empty.

As mentioned above, files and folders belonging to a user can be distributed across many different contexts. For instance, some files and/or folders can be stored locally on the user's computing device. Other files and/or folders can be stored in a cloud storage service which the user can access through a network connection. Still other files and/or folders can be stored in a collaborative environment in which multiple users have access subject to permissions and data safety protocols. As a result, modern file management applications often provide disjointed and cumbersome user experiences.

In contrast, the expanded folder previews serve to streamline the user experience of file management applications by enabling a user to interact with files within a folder without navigating into the folder itself. Stated another way, the user can visually expand the folder in the user interface to display some or all of the files within without transitioning away from the user interface. In this way, the user can interact with several folders at the same time as well as across different contexts (e.g., local and cloud). Consequently, operations that typically involved several user inputs and different user interfaces are streamlined to a single user interface that can dynamically adapt to the needs of a user.

Various examples, scenarios, and aspects that enable the techniques herein are described below with respect to FIGS. 1-7.

Figure 1:
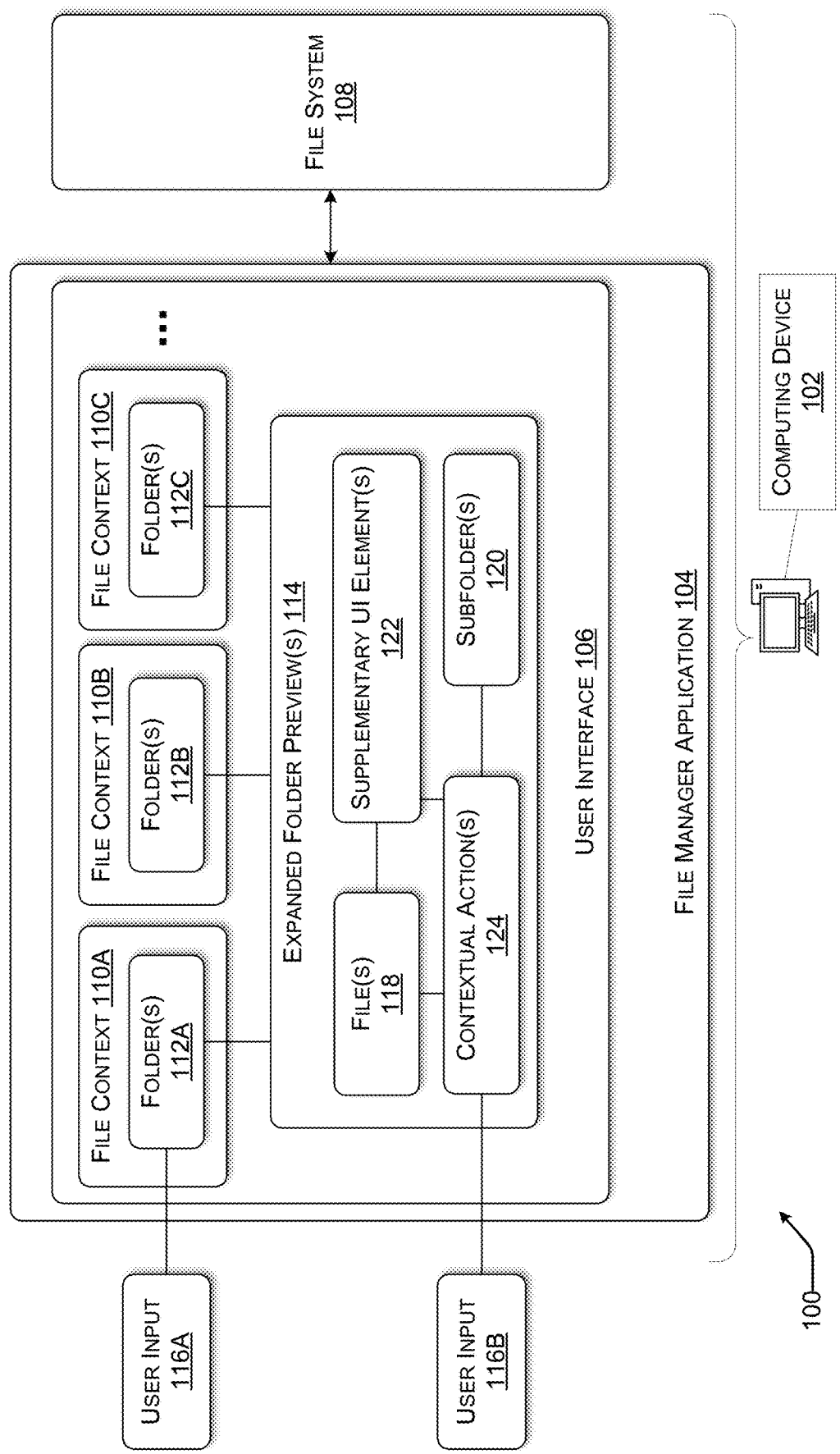
FIG. 1 is a block diagram of a system for implementing a streamlined file manager user interface with customized contextual actions.

FIG. 1 illustrates a system 100 in which a computing device 102 provides a file manager application 104 with a user interface 106 for interacting with a file system 108. In various examples, the file system 108 is a process and data structure implemented by an operating system for controlling data storage and retrieval. Accordingly, the file system 108 can define various file contexts 110A—110C. For example, the file context 110A can be local context containing folders 112A that are stored locally on the computing device 102. Conversely, the file context 110B can be a cloud context containing folders 112B that are stored remotely (e.g., in a datacenter) and accessed by the computing device 102 over a network connection in association with an account belonging to the computing device 102 and/or a user of the computing device 102. In still another example, the file context 110C can be a collaborative context containing folders 112C that, like the cloud file context 110B, are stored remotely but are accessible by multiple users and/or multiple computing devices. For instance, the folders 112C can contain work documents that a team of users work on together. It should be understood that while only three file contexts 110A-110C are illustrated, the file system 108 can include any number of file contexts 110.

Since modern file systems often span multiple file contexts, the file manager application 104 described herein provides the user interface 106 that offers a smooth and intuitive user experience. That is, the user interface 106 can be configured to display an expanded folder preview 114 in response to a user input 116A selecting from a list of folders 112A in a file context 110A. It should be understood that the user input 116A does not navigate into the folder 112A. Stated another way, the system 100 adapts the existing user interface 106 in response to the user input 116A. In contrast, navigating into the folder 112A involves generating a different user interface to display the contents of the folder 112A.

As will be elaborated upon below, expanded folder preview 114 can be a visual expansion of the selected folder 112A that displays various files 118 stored within the selected folder 112A. In addition to the files 118, a folder 112A can also include additional subfolders 120 which are also displayed in the expanded folder preview 114. In various examples, individual files 118 and subfolders 120 can be presented using corresponding user interface elements to form a list within the expanded folder preview 114. Furthermore, the expanded folder preview 114 can include supplementary UI elements 122 which accompany the files 118 and subfolders 120.

The supplementary UI elements 122 can be customized, both visually and functionally, based on the file context 110A of the associated folder 112A. For example, in a collaborative file context 110C, a supplementary UI element 122 for a file 118 can display user access indicators to identify other users who have access to the file. Moreover, the user access indicators can be configured to display the most recent users who opened the file, new users who have been added to collaborate on the file, a timestamp for the most recent changes, and so forth. In this way, the user experience is clearly differentiated and enhanced for different file contexts 110. In addition, the expanded folder preview 114 enables various contextual actions 124 that can be triggered with another user input 116B. For example, a user can open an expanded folder preview 114 for a first folder 112A and a second folder 112B within the user interface 106. In this scenario, the user can then perform a contextual action 124 by transferring a file 118 from the first folder 112A to the second folder 112B with a single user input 116B. In another example, the user may perform a contextual action 124 by uploading a file 118 from a local file context 110A to a cloud file context 110B. In response to the contextual action 124, the supplementary UI element 122 associated with the file 118 can change to visually indicate the upload contextual action 124.

Figure 2:
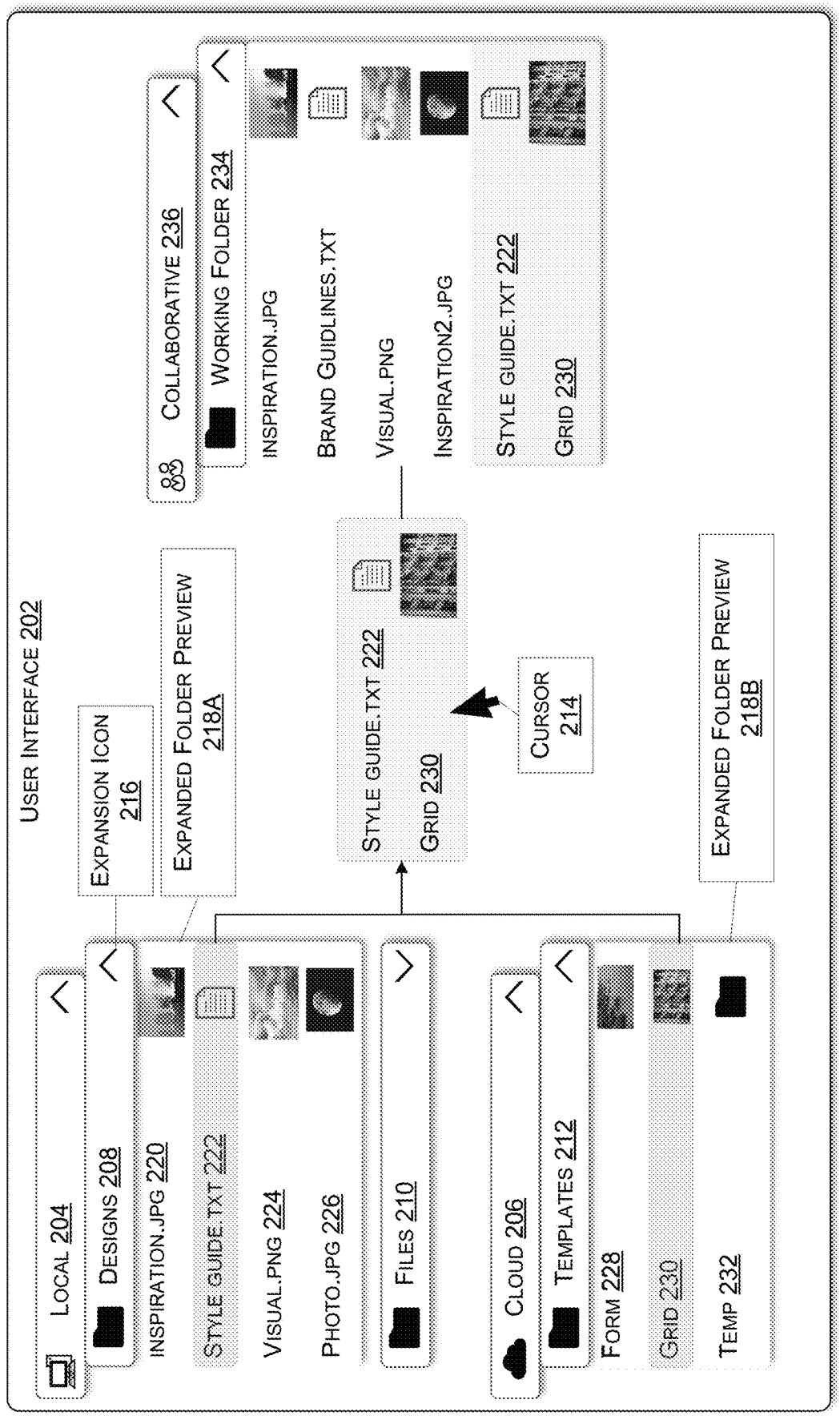
FIG. 2 illustrates a first example user interface in which the streamlined file manager user experience enables simultaneous interaction with multiple folders.

Turning now to FIG. 2, aspects of a user interface 202 for enabling simultaneous interaction with multiple folders and contextual actions are shown and described. As mentioned above, the file system 108 and the file manager application 104 span multiple file contexts 110. For example, as shown in FIG. 2, the user interface 202 can enable a user to access a "local" file context 204 and a "cloud" file context 206. Each of the "local" file context 204 and the "cloud" file context 206 can respectively contain folders. For example, the "local" file context 204 contains a "designs" folder 208 and a "files" folder 210. Similarly, the "cloud" file context 206 contains a "templates" folder 212.

In various examples, a user can utilize a cursor 214 to interact with the user interface 202. For instance, the user can select an expansion icon 216 at the "designs" folder 208 with the cursor 214 to cause a display of an expanded folder preview 218A which visually expands the associated "designs" folder 208 within the user interface 202. The expanded folder preview 218A displays some or all of the contents of the associated "designs" folder 208. For example, the expanded folder preview 218A includes an "inspiration.jpg" file 220, a "style guide.txt" file 222, a "visual.png" file 224, and a "photo.jpg" file 226. Similarly, the expanded folder preview 218B displays a "form" file 228, a "grid" file 230, and a "temp" subfolder 232. In addition, a user can optionally leave some folders unexpanded such as the "files" folder 210. It should be understood that while a cursor 214 is illustrated, any suitable input method can be utilized to interact with the user interface 202 such as a touch input, a pointing device, a gesture input, and so forth.

Using the expanded folder previews 218A and 218B, a user can perform various contextual actions. For example, the user can transfer files from multiple folders at the same time. As shown, the user can utilize the cursor 214 to select a first file, the "style guide.txt" file 222 in the "designs" folder 208 and a second file, the "grid" file 230 in the "templates" folder 212 as indicated by the shading. Subsequently, the user can transfer the selected "style guide.txt" file 222 and the "grid" file 230 from their original file contexts—the "local" file context 204 and the "cloud" file context 206 respectively—to a "working folder" 234 within a "collaborative" file context 236. In this way, the expanded folder previews 218A and 218B enable simultaneous interaction with multiple folders distributed across multiple file contexts within a single user interface 202 thereby streamlining the user experience and improving efficiency.

Figure 3:
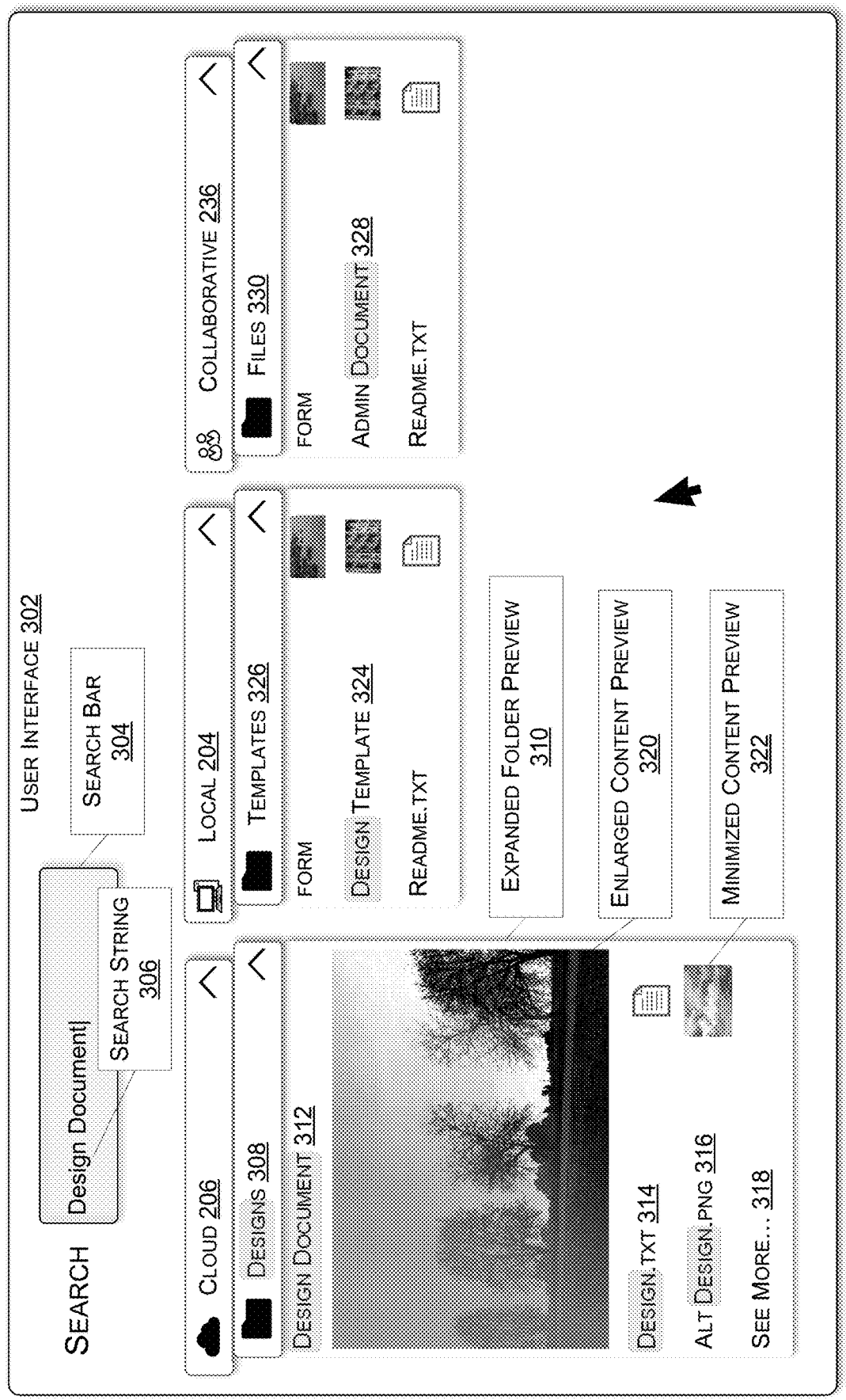
FIG. 3 illustrates a second example user interface in which the streamlined file manager user experience enhances file search features.

Turning now to FIG. 3, aspects of a user interface 302 for streamlining the user experience when utilizing search features in a file manager application are shown and described. Using a search bar 304, a user can input a search string 306 to surface folders and/or files across various file contexts that match a query represented by the search string 306. As shown in FIG. 3, a user inputs a "design document" search string 306. In response, folders and files matching some or all of the search string 306 are displayed in the user interface 302. As shown, a "designs" folder 308 can be displayed with an expanded folder preview 310. Accordingly, files within the "designs" folder 308 that match the search string 306 may also be displayed. For instance, a "design document" file 312, a "design.txt" file 314, and an "alt design" file 316 contained within the "designs" folder 308 are displayed in the expanded folder preview 310. In addition, the expanded folder preview 310 can also include a "see more" option 318 to display the full contents of the "designs" folder 308. In various examples, the "see more" option 318 can be displayed due to the number of files contained in the associated "designs" folder 308 exceeds what can be displayed in the expanded folder preview 310.

Furthermore, the files 312-318 that are displayed in the expanded folder preview 310 can be selected and ranked based on a relevance to the search string 306. For instance, the "design document" file 312 is displayed first in the expanded folder preview 310 due to its exact match to the search string 306. In addition, an enlarged content preview 320 displaying a large rendering of the file data of the "design document" file 312 is also displayed. The enlarged content preview 320 in combination with the high relative position of the "design document" file 312 within the expanded folder preview 310 can serve to increase the visual emphasis of files matching the search string 306 and direct user attention. Other files such as the "alt design.png" file 316 can be displayed with a minimized content preview 322 displaying a rendering of the file data of the "alt design" file 316 that is reduced in size relative to the enlarged content preview 320.

In addition, other files within other folders such as the "design template" file 324 in the "templates" folder 326 and the "admin document" file 328 in the "files" folder 330 that satisfy some or all of the search string 306 can be displayed as search results. However, due to a reduced relevance to the search string 306 in relation to the "design document" file 312, the "design template" file 324 and the "admin document" file 328 can be displayed in a similar manner to the "alt design.png" file 316 with a minimized content preview 322. Moreover, folders such as the "templates" folder 326 and the "files" folder 330 can be placed successively to the right of the "designs" folder 308 within the user interface 302. In this way, results that are the most relevant to the search string 306 can be displayed first in an ordered list of results such as the one shown in FIG. 3 to draw attention to relevant results thereby improving efficiency and productivity.

Figure 4A:
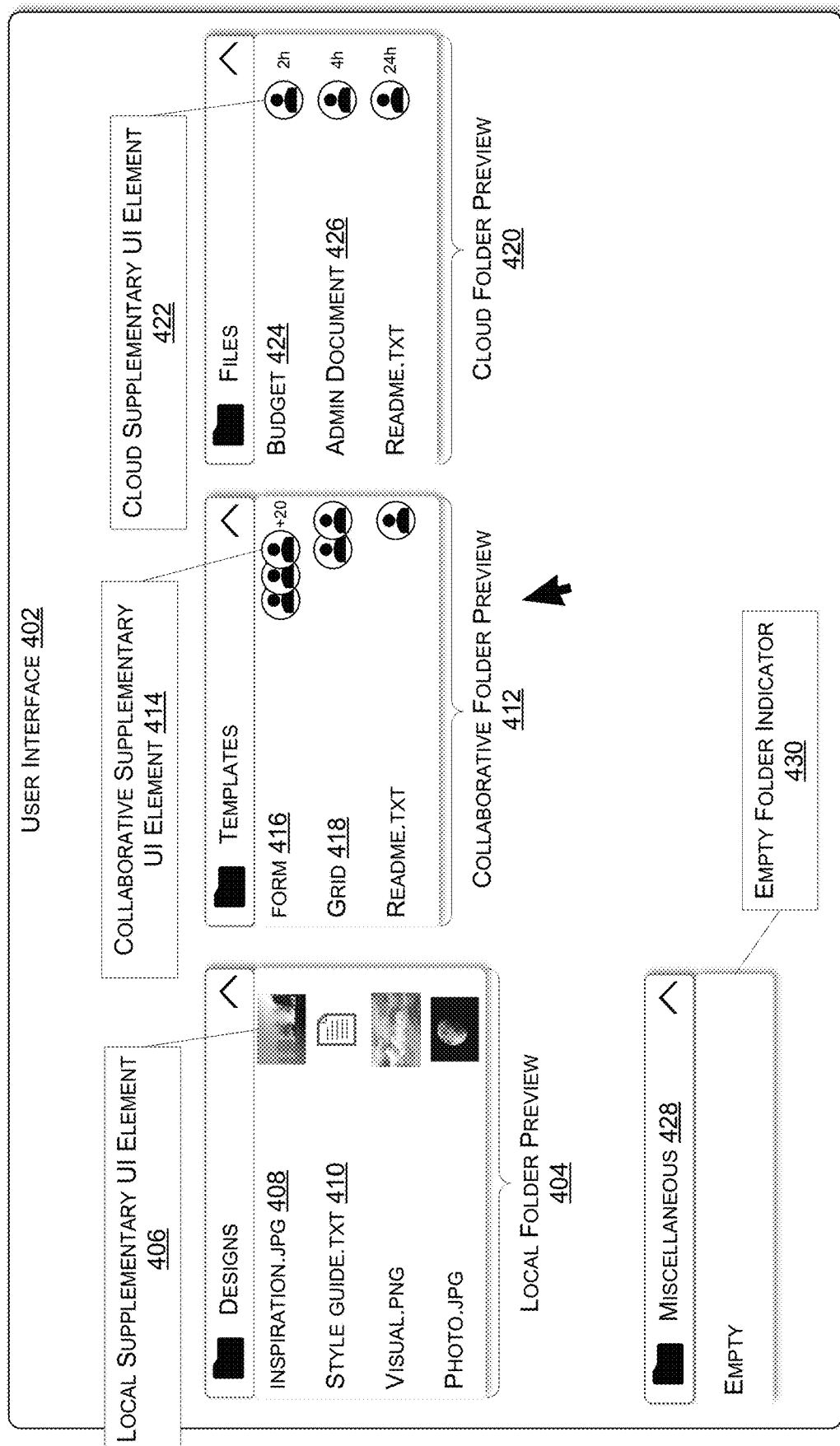
FIG. 4A illustrates a third example user interface in which the streamlined file manager user experience customizes supplementary user interface elements based on file context.

Turning now to FIG. 4A, aspects of an example user interface 402 illustrating customized folder previews are shown and described. As mentioned above with respect to FIG. 1, various supplementary UI elements 122 can be customized based on the file context 110A to differentiate the user experience of expanded folder previews 114 across different file contexts 110. For example, as shown in FIG. 4A, a local folder preview 404 can include a local supplementary UI element 406. The local supplementary UI element 406 provides a preview rendering of the file data for an associated file such as the "inspiration.jpg" file 408. In various examples, the local supplementary UI element 406 can be configured to match a file type within the local folder preview 404. For instance, the "inspiration.jpg" file 408 can be an image file type. In response to detecting the image file type, the local supplementary UI element 406 can be configured as an image rendering of the file data for the "inspiration.jpg" file 408. In another example, a "style guide.txt" file 410 can be a text file type. Accordingly, a local supplementary UI element for the "style guide.txt" file 410 can display a preview of the text data within the "style guide.txt" file 410. Alternatively, the local supplementary UI element for the "style guide.txt" file 410 can be an icon visually indicating the text file type.

In another example of customizable folder previews, a collaborative folder preview 412 can include a collaborative supplementary UI element 414. The collaborative supplementary UI element 414 can be a user access indicator (e.g., a profile picture icon) indicating various users who have access to an associated file in a collaborative file context. For example, the collaborative supplementary UI element 414 can indicate that greater than twenty users have access to a "form" file 416. In addition, files presented in the collaborative folder preview 412 can be sorted using various criteria. In one example, the collaborative folder preview 412 can be sorted based on a number of users that have access to a file. Accordingly, the "form" file 416 is displayed above the "grid" file 418 due to the greater number of users that have access. Alternatively, files in the collaborative folder 412 can be sorted based on a priority associated with the file and/or users who have access to the file. For example, a new batch of users may have been recently added to the "form" file 416. In response, the "form" file 416 can be displayed first to make a user aware of new collaborators. Conversely, a user may have been newly added by a file owner to an existing file such as the "form" file 416. Accordingly, the "form" file 416 can be displayed first in the collaborative folder preview 412 to inform the user of their new file access.

In still another example of the customizable folder previews, a cloud folder preview 420 can include a cloud supplementary UI element 422. In various examples, the cloud supplementary UI element 422 can indicate a timestamp of the most recent changes to an associated file. For instance, the cloud supplementary UI element 422 shows that the "budget" file 424 was last edited two hours ago while the "admin document" file 426 was last edited four hours ago. Files within the cloud folder preview 420 can be sorted based on a time of the most recent modification and/or addition. For instance, the "budget" file 424 can be displayed ahead of the "admin document" file 426 due to the more recent time of last modification.

Moreover, regardless of file context, a folder that does not contain any files such as the "miscellaneous" folder 428 can include an empty folder indicator 430. In this way, a user can save time by seeing a folder is empty without navigating into the folder itself thereby streamlining the user experience. It should be understood that all of the local folder preview 404, the collaborative folder preview 412, and the cloud folder preview 420 can be displayed concurrently in the same user interface 402. Consequently, a user can access file distributed across a plurality of file contexts and simultaneously interact with different folder previews 404, 412, 420 and associated supplementary UI elements 406, 414, and 422.

Figure 4B:
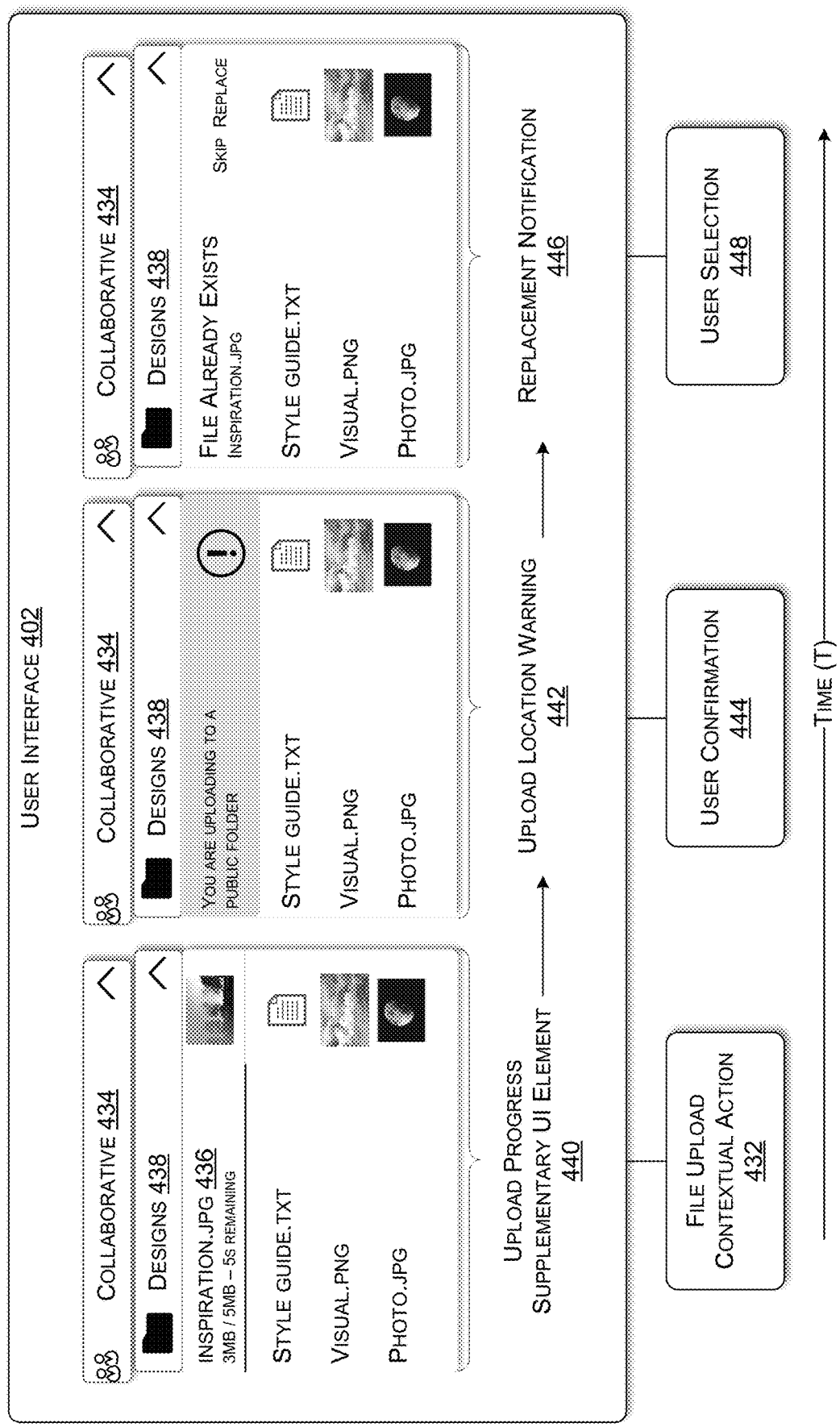
FIG. 4B a fourth example user interface in which the streamlined file manager user experience dynamically updates supplementary user interface elements based on user input within a file context.

Proceeding to FIG. 4B additional aspects of customizable supplementary UI elements are shown and described. As mentioned above, various supplementary UI elements can dynamically adapt over time (T) in response to contextual actions initiated by a user. For example, a use can initiate a file upload contextual action 432 within a "collaborative" file context 434. For example, a user can upload an "inspiration.jpg" file 436 to a "designs" folder 438. In response to the file upload contextual action 432, an upload progress supplementary UI element 440 can be displayed alongside the "inspiration.jpg" file 436. The upload progress supplementary UI element 440 can include a progress bar and uploaded file size to visually indicate progress as well as an estimated time remaining to complete the file upload contextual action 432.

However, due to the multi-user nature of the "collaborative" file context 434, the designs folder 438 may be a public folder which can be accessible by any number of users (e.g., within a team, within a company). Accordingly, in response to the file upload contextual action 432, an upload location warning 442 can be displayed to inform the user that the "insipiration.jpg" file 436 is being uploaded to a public folder. Upon receiving a user confirmation 444, the file upload can continue. Conversely, the user confirmation 444 be denied by the user. In response, the file upload can be terminated.

In some examples, the "inspiration.jpg" file 436 may already exist in the "designs" folder 438. For instance, a different user may have previously uploaded a "inspiration.jpg" file. Upon detecting a file name that matches "inspiration.jpg" file 436 within the "designs" folder a replacement notification 446 can be displayed to query whether a user wishes to skip and terminate the file upload contextual action 432 or replace the existing file with the "inspiration.jpg" file 436 and continue the upload. Accordingly, the user can provide a user selection 448 responsive to the replacement notification 446. As shown, the user interface 402, by utilizing various supplementary UI elements such as the upload progress supplementary UI element 440, the upload location warning 442, and the replacement notification 446 can dynamically adapt over time (T) in response to a contextual action. It should be understood that while the example shown and discussed with respect to FIG. 4B pertain to a specific file upload contextual action 432, the user interface 402 can adapt to response to any type of action within a file context.

Proceeding to FIG. 5, aspects of a routine 500 for enabling expanded folder previews are shown and described. With reference to FIG. 5, the routine 500 begins at operation 502 where a system displays a plurality of user elements representing a corresponding plurality of folders distributed across a plurality of file contexts in a file manager user interface.

Next, at operation 504, the system receives a user input at the file manager user interface selecting a folder from the plurality of folders. The user input does not navigate into the selected folder. That is, the file manager user interface that displays the plurality of folders does not transition, or switch, to a different file manager user interface that displays the content of a single folder.

Then, at operation 506, in response to the user input, the system displays a visual expansion of the selected folder comprising a user interface element representing a content item of the folder (e.g., files, subfolders).

Next, at operation 508, the system determines a file context of the folder that was selected by the user input.

Finally, at operation 510, the system generates a supplementary user interface element based on the file context that is displayed concurrently with the user interface element representing a content of the folder (e.g., files, subfolders).

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the routine 500 may be also implemented in other ways. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
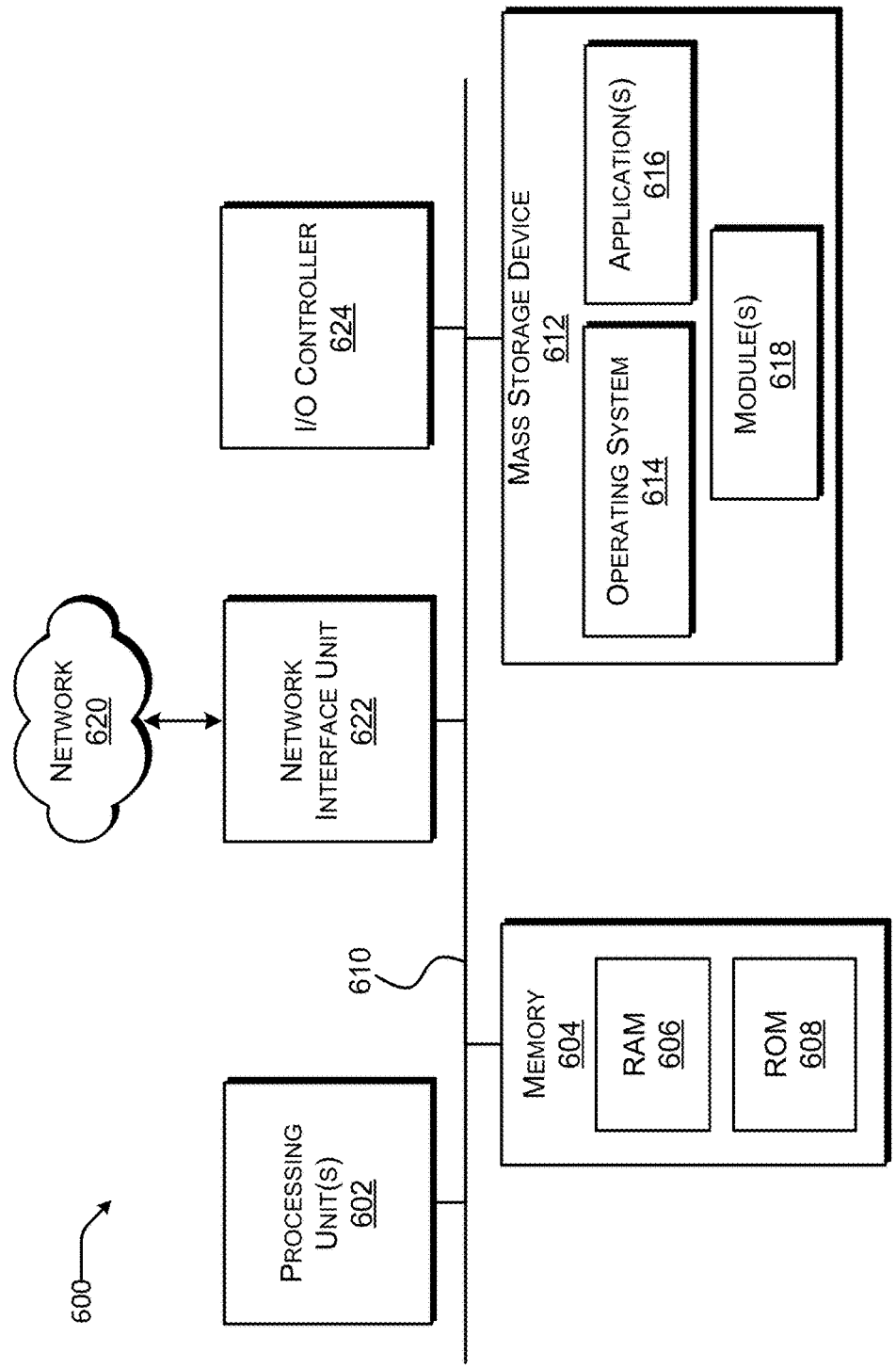
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
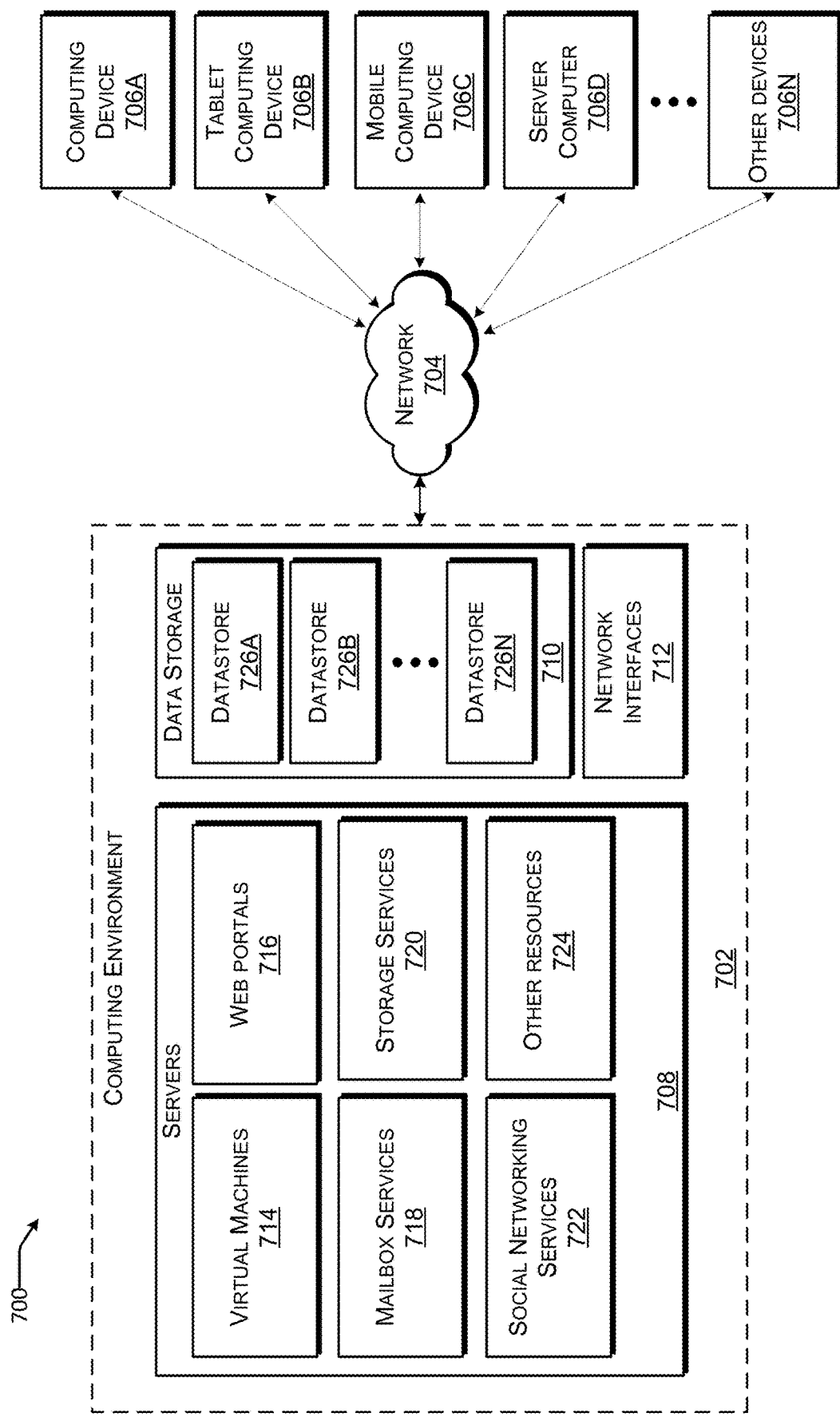
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method comprising: displaying a plurality of user interface elements representing an associated plurality of folders distributed across a plurality of file contexts in a file manager user interface; receiving a user input indicating a selection of a folder from the plurality of folders; in response to the user input, displaying a visual expansion of the folder comprising a user interface element representing a content item within the folder; determining a file context of the folder selected by the user input; and generating a supplementary user interface element based on the file context of the folder that is displayed concurrently with the user interface element representing the content within the folder.

Example Clause B, the method of Example Clause A, wherein the user input does not navigate into the folder such that the file manager user interface does not transition to a different file manager user interface that displays content items of a single folder.

Example Clause C, the method of Example Clause A or Example Clause B, wherein the user input comprises a hover gesture that satisfies a threshold hover time.

Example Clause D, the method of Example Clause A or Example Clause B, wherein the user input comprises a click input to expand the folder.

Example Clause E, the method of any one of Example Clause A through D, wherein: the file context of the folder is a cloud storage file context; and the supplementary user interface element is a change time indicator.

Example Clause F, the method of any one of Example Clause A through D, wherein: the file context of the folder is a collaborative file context; and the supplementary user interface element is a user access indicator.

Example Clause G, the method of any one of Example Clause A through F, further comprising: receiving a second user input selecting a second folder from the plurality of folders; and receiving a third user input indicating a movement of a first file from the folder and a second file from the second folder to a third folder from the plurality of folders.

Example Clause H, the method of any one of Example Clause A through G, wherein: the folder does not contain content; and the user interface element indicates an empty status of the folder.

Example Clause I, a system comprising: a processing unit; a computer-readable medium having encoded thereon computer-readable instructions that, when executed by the processing unit, cause the system to: display a plurality of user interface elements representing an associated plurality of folders distributed across a plurality of file contexts in a file manager user interface; receive a user input indicating a selection of a folder from the plurality of folders; in response to the user input, display a visual expansion of the folder comprising a user interface element representing a content item within the folder; determine a file context of the folder selected by the user input; and generate a supplementary user interface element based on the file context of the folder that is displayed concurrently with the user interface element representing the content item within the folder.

Example Clause J, the system of Example Clause I, wherein the user input does not navigate into the folder such that the file manager user interface does not transition to a different file manager user interface that displays content items of a single folder.

Example Clause K, the system of Example Clause I or Example Clause J, wherein the user input comprises a hover gesture that satisfies a threshold hover time.

Example Clause L, the system of Example Clause I or Example Clause J, wherein the user input comprises a click input to expand the folder.

Example Clause M, the system of any one of Example Clause I through L, wherein: the file context of the folder is a cloud storage file context; and the supplementary user interface element is a change time indicator.

Example Clause N, the system of any one of Example Clause I through L, wherein: the file context of the folder is a collaborative file context; and the supplementary user interface element is a user access indicator.

Example Clause O, the system of any one of Example Clause I through N, wherein the computer-readable instructions further cause the system to: receive a second user input selecting a second folder from the plurality of folders; and receive a third user input indicating a movement of a first file from the folder and a second file from the second folder to a third folder from the plurality of folders.

Example Clause P, the system of any one of Example Clause I through O, wherein: the folder does not contain content; and the user interface element indicates an empty status of the folder.

Example Clause Q, a computer-readable storage medium having encoded thereon computer-readable instructions that, when executed by a processing unit, causes a system to: display a plurality of user interface elements representing an associated plurality of folders distributed across a plurality of file contexts in a file manager user interface; receive a user input indicating a selection of a folder from the plurality of folders; in response to the user input, display a visual expansion of the folder comprising a user interface element representing a content item within the folder; determine a file context of the folder selected by the user input; and generate a supplementary user interface element based on the file context of the folder that is displayed concurrently with the user interface element representing the content item within the folder.

Example Clause R, the computer-readable storage medium of Example Clause Q, wherein the user input does not navigate into the folder such that the file manager user interface does not transition to a different file manager user interface that displays content items of a single folder.

Example Clause S, the computer-readable storage medium of Example Clause Q or Example Clause R, wherein: the file context of the folder is a cloud storage file context; and the supplementary user interface element is a change time indicator.

Example Clause T, the computer-readable storage medium of Example Clause Q or Example Clause R, wherein: the file context of the folder is a collaboration file context; and the supplementary user interface element is a user access indicator.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different file contexts).

In closing, although the various configurations have been described in language specific to structural features and/or methodological acts, it is to be understood that the subject matter defined in the appended representations is not necessarily limited to the specific features or acts described.

Rather, the specific features and acts are disclosed as example forms of implementing the claimed subject matter.

We claim:
1. A method comprising:
displaying, by a computing device including a processing unit and a memory, a plurality of user interface elements representing an associated plurality of folders distributed across a plurality of file contexts in a file manager user interface;
receiving, at the computing device, a first user input indicating a selection of a first folder from the plurality of folders;
in response to the first user input, displaying, by the computing device, a first visual expansion of the first folder comprising a user interface element representing a first content item within the first folder;
determining, by the computing device, a first file context of the first folder selected by the first user input;
generating a first supplementary user interface element based on the first file context of the first folder that is displayed by the computing device concurrently and in association with the user interface element representing the first content item within the first folder;
receiving, at the computing device, a second user input indicating a selection of a second folder from the plurality of folders;
in response to the second user input, displaying, by the computing device, a second visual expansion of the second folder concurrently with the first visual expansion of the first folder, the second visual expansion comprising a user interface element representing a second content item within the second folder;
determining, by the computing device, a second file context of the second folder selected by the second user input;
generating a second supplementary user interface element based on the second file context of the second folder that is displayed by the computing device concurrently and in association with the user interface element representing the second content item within the second folder; and
receiving, at the computing device, a third user input indicating a selection and a simultaneous movement of the first content item and the second content item from the first visual expansion of the first folder and the second visual expansion of the second folder to a third folder associated with a third file context.

2. The method of claim 1, wherein the first user input does not navigate into the first folder such that the file manager user interface does not transition to a different file manager user interface that displays content items of a single folder.

3. The method of claim 1, wherein the first user input comprises a hover gesture that satisfies a threshold hover time.

4. The method of claim 1, wherein the first user input comprises a click input to expand the first folder.

5. The method of claim 1, wherein:
the first file context of the first folder is a cloud storage file context; and
the first supplementary user interface element is a change time indicator.

6. The method of claim 1, wherein:
the first file context of the first folder is a collaborative file context; and
the first supplementary user interface element is a user access indicator.

7. The method of claim 1, wherein:
the third folder does not contain content; and
a third user interface element indicates an empty status of the third folder.

8. A system comprising:
a processing unit;
a computer-readable medium having encoded thereon computer-readable instructions that, when executed by the processing unit, cause the system to:
display a plurality of user interface elements representing an associated plurality of folders distributed across a plurality of file contexts in a file manager user interface;
receive a first user input indicating a selection of a first folder from the plurality of folders;
in response to the first user input, display a first visual expansion of the first folder comprising a user interface element representing a first content item within the first folder;
determine a first file context of the first folder selected by the first user input;
generate a first supplementary user interface element based on the first file context of the first folder that is displayed concurrently and in association with the user interface element representing the first content item within the first folder;
receive a second user input indicating a selection of a second folder from the plurality of folders;
in response to the second user input, display a second visual expansion of the second folder concurrently with the first visual expansion of the first folder, the second visual expansion comprising a user interface element representing a second content item within the second folder;
determine a second file context of the second folder selected by the second user input;
generate a second supplementary user interface element based on the second file context of the second folder that is displayed by the computing device concurrently and in association with the user interface element representing the second content item within the second folder; and
receive a third user input indicating a selection and a simultaneous movement of the first content item and the second content item from the first visual expansion of the first folder and the second visual expansion of the second folder to a third folder associated with a third file context.

9. The system of claim 8, wherein the first user input does not navigate into the first folder such that the file manager user interface does not transition to a different file manager user interface that displays content items of a single folder.

10. The system of claim 8, wherein the first user input comprises a hover gesture that satisfies a threshold hover time.

11. The system of claim 8, wherein the first user input comprises a click input to expand the first folder.

12. The system of claim 8, wherein:
the first file context of the first folder is a cloud storage file context; and
the first supplementary user interface element is a change time indicator.

13. The system of claim 8, wherein:
the first file context of the first folder is a collaborative file context; and
the first supplementary user interface element is a user access indicator.

14. A computer-readable storage medium having encoded thereon computer-readable instructions that, when executed by a processing unit, causes a system to:
- display a plurality of user interface elements representing an associated plurality of folders distributed across a plurality of file contexts in a file manager user interface;
- receive a first user input indicating a selection of a first folder from the plurality of folders;
- in response to the first user input, display a first visual expansion of the first folder comprising a user interface element representing a first content item within the first folder;
- determine a first file context of the first folder selected by the first user input;
- generate a first supplementary user interface element based on the first file context of the first folder that is displayed concurrently and in association with the user interface element representing the first content item within the first folder;
- receive a second user input indicating a selection of a second folder from the plurality of folders;
- in response to the second user input, display a second visual expansion of the second folder concurrently with the first visual expansion of the first folder, the second visual expansion comprising a user interface element representing a second content item within the second folder;
- determine a second file context of the second folder selected by the second user input;
- generate a second supplementary user interface element based on the second file context of the second folder that is displayed by the computing device concurrently and in association with the user interface element representing the second content item within the second folder; and
- receive a third user input indicating a selection and a simultaneous movement of the first content item and the second content item from the first visual expansion of the first folder and the second visual expansion of the second folder to a third folder associated with a third file context.

15. The computer-readable storage medium of claim 14, wherein the first user input does not navigate into the first folder such that the file manager user interface does not transition to a different file manager user interface that displays content items of a single folder.

16. The computer-readable storage medium of claim 14, wherein:
- the first file context of the first folder is a cloud storage file context; and
- the first supplementary user interface element is a change time indicator.

17. The computer-readable storage medium of claim 14, wherein:
- the first file context of the first folder is a collaboration file context; and
- the first supplementary user interface element is a user access indicator.

18. The method of claim 1, wherein:
- the first file context is a local storage file context;
- the second file context is a cloud storage file context; and
- the third file context is a collaborative file context.

19. The system of claim 8, wherein:
- the first file context is a local storage file context;
- the second file context is a cloud storage file context; and
- the third file context is a collaborative file context.

20. The computer-readable storage medium of claim 14, wherein:
- the first file context is a local storage file context;
- the second file context is a cloud storage file context; and
- the third file context is a collaborative file context.

* * * * *